(12) United States Patent
Soomro et al.

(10) Patent No.: US 7,620,405 B2
(45) Date of Patent: Nov. 17, 2009

(54) METHOD AND SYSTEM FOR PROVIDING A SINGLE UNIFIED CHANNEL QUIETING/MEASUREMENT REQUEST ELEMENT IN AN 802.11 WIRELESS LOCAL AREA NETWORK

(75) Inventors: Amjad Soomro, Hopewill Junction, NY (US); Sunghyun Choi, Kwanak-gu (KR)

(73) Assignee: Koninklijke Philips Electronics N.V., Eindhoven (NL)

( * ) Notice: Subject to any disclaimer, the term of this patent is extended or adjusted under 35 U.S.C. 154(b) by 555 days.

(21) Appl. No.: 10/505,691

(22) PCT Filed: Mar. 7, 2003

(86) PCT No.: PCT/IB03/00837

§ 371 (c)(1),
(2), (4) Date: Aug. 25, 2004

(87) PCT Pub. No.: WO03/077482

PCT Pub. Date: Sep. 18, 2003

(65) Prior Publication Data

US 2005/0111415 A1    May 26, 2005

Related U.S. Application Data

(60) Provisional application No. 60/427,259, filed on Nov. 18, 2002, provisional application No. 60/362,971, filed on Mar. 8, 2002.

(51) Int. Cl.
*H04B 7/212* (2006.01)
(52) U.S. Cl. .................. 455/456.4; 370/348; 370/322
(58) Field of Classification Search ............. 455/456.4; 370/338
See application file for complete search history.

(56) References Cited

U.S. PATENT DOCUMENTS

| 6,757,522 | B1 * | 6/2004 | Naegeli et al. ............ 455/67.11 |
| 6,865,609 | B1 * | 3/2005 | Gubbi et al. ................ 709/230 |
| 2001/0047424 | A1 * | 11/2001 | Alastalo et al. ............ 709/236 |
| 2002/0007407 | A1 * | 1/2002 | Klein ....................... 709/225 |
| 2003/0058923 | A1 * | 3/2003 | Chen et al. ................ 375/133 |

OTHER PUBLICATIONS

"Measurement/Quiet Request Element for DFS in TGh", by A. Soomro et al.

\* cited by examiner

*Primary Examiner*—Nick Corsaro
*Assistant Examiner*—Joel Ajayi
(74) *Attorney, Agent, or Firm*—Larry Liberchuk (57) ABSTRACT

A channel quieting/measurement request element is provided for use in a wireless local area network. The unified element of the invention integrates a dual capability for performing channel quieting and for making measurement requests of one or more stations in the network. According to another aspect of the invention, a conventional channel quieting element is modified to include provisions for defining an offset time and an offset duration interval for performing channel quieting.

5 Claims, 6 Drawing Sheets

/—10

| octets : 1 | octets : 1 | octets : 1 | octets : 1 | octets : 1 | octets : 1 | octets : 1 | octets : 1 |
|---|---|---|---|---|---|---|---|
| Element ID | Length | Measurement Duration | Measurement Offset | Non-Measurement Duration | Channel Numbers | Report Type | Report Time Limit |

/—20

| octets : 1 | octets : 1 | octets : 1 | octets : 1 | octets : 6-2300 |
|---|---|---|---|---|
| Spectrum Management | Channel Meas Req | Activation Delay | Dialog Token | Channel Measurement Method Element |

FIG. 1a

| octets : 1 | octets : 1 | octets : 1 | octets : 1 | octets : 1 | octets : 1 | octets : 1 |
|---|---|---|---|---|---|---|
| Element ID | Length | Measurement Duration | Measurement Offset | Non-Measurement Duration | Channel Numbers | Report Type |

Report Time Limit (octets : 1)

| octets : 1 | octets : 1 | octets : 1 | octets : 1 | octets : 6-2300 |
|---|---|---|---|---|
| Spectrum Management | Channel Meas Reg | Activation Delay | Dialog Token | Channel Measurement Method Element |

| octets : 1 | octets : 1 | octets : 2 | octets : n | octets : 1 | octets : 1 |
|---|---|---|---|---|---|
| Element ID | Length | Measurement Duration | Channel Numbers | Report Type | Report Time Limit |

METHOD AND SYSTEM FOR PROVIDING A SINGLE UNIFIED CHANNEL QUIETING/MEASUREMENT REQUEST ELEMENT IN AN 802.11 WIRELESS LOCAL AREA NETWORK

CROSS REFERENCE TO RELATED CASES

Applicants claim the benefit of Provisional Applications Ser. Nos. 60/362,971, filed Mar. 8, 2002 and 60/427,259, filed Nov. 18, 2002, and PCT International Application Ser. No. PCT/IB03/00837, filed Mar. 7, 2003.

The present invention relates to wireless local area networks (WLANs). More particularly, the present invention relates to a method and system for providing a single unified measurement/quiet request element at the MAC layer in a WLAN.

Figures 1A, 1B:
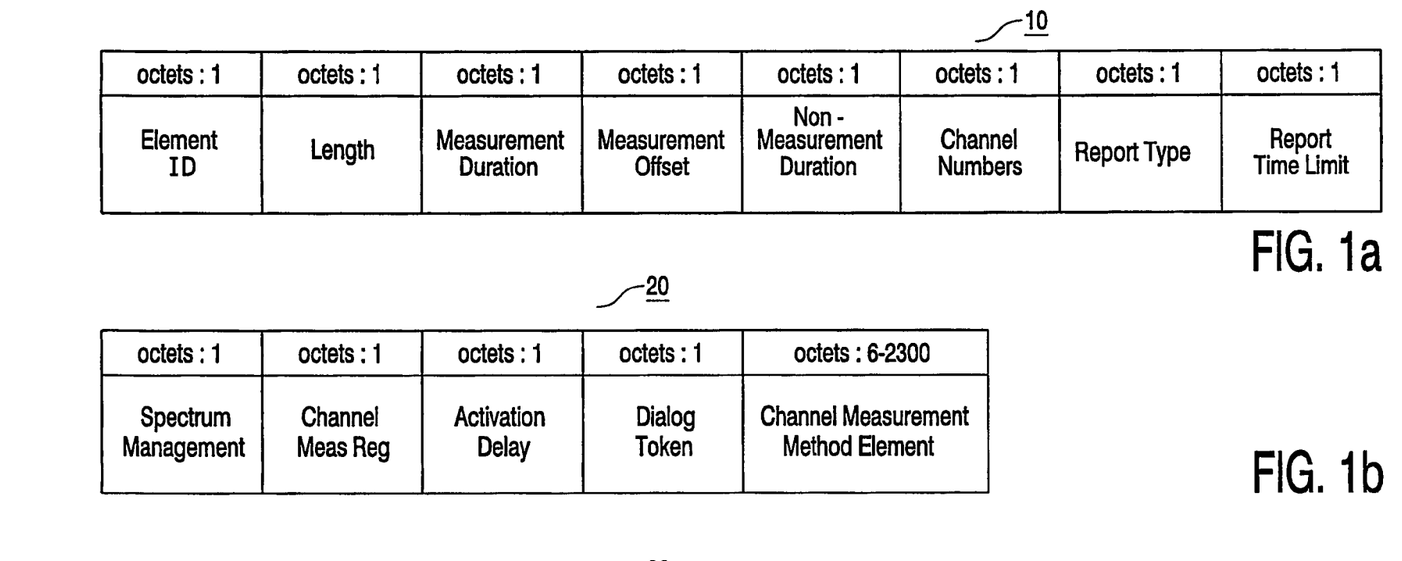
FIG. 1a illustrates the format of a channel measurement request frame which is included as part of a spectrum management frame.
FIG. 1b illustrates a basic measurement request element.
Figure 1C:
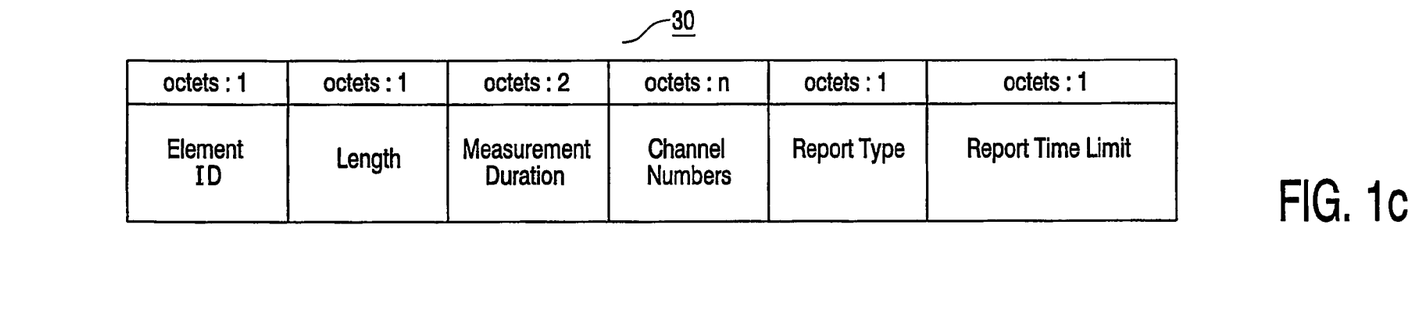
FIG. 1c illustrates a CF type measurement request element.

A current mechanism defined in the IEEE 802.11h D1.1draft standard, January 2002, for performing measurements in an 802.11 based wireless local area network (WLAN) is shown and described in FIGS. 1a-c.

FIG. 1a illustrates the format of a channel measurement request frame 10 which is included as part of a spectrum management frame, for making measurement requests in a wireless local area network (WLAN). The channel measurement request frame 10 includes, inter alia, a 'channel measurement method' element field for specifying a measurement request element. Two types of measurement request elements are shown in FIGS. 1b and 1c, respectively.

FIG. 1b illustrates a basic measurement request element 20 and FIG. 1c illustrates a CF type measurement request element 30.

Presently, the IEEE 802.11 standard provides for a quiet channel element which defines an interval during which no transmission shall occur on the current operating channel. This interval may be used to assist in making channel measurements, like those specified in FIGS. 1b and 1c, without interference from other STAs in the BSS or IBSS. For example, the quiet channel element may be used to allow a channel to be tested more easily for primary users without interference.

One drawback of the present scheme for quieting the channel is that the channel quiet element may only be transmitted as part of a beacon transmission. This is restrictive in the sense that it may be necessary to modify a most recently transmitted channel quiet element or otherwise transmit a new channel quiet element between successive beacon transmissions so as to satisfy European DFS regulatory requirements for operation in the 5 GHz band.

Another drawback of the current quiet channel element is that the quiet time specified in the element always starts immediately after the beacon transmission. It would be desirable, in certain cases, to start the quiet time sometime after the start of a beacon transmission at a time when radar transmissions are expected. In this way, it would not be necessary to quiet the channel for the entire beacon interval.

An additional drawback of the current channel quieting mechanism is that it is not integrated or tied to the channel measurement element of FIG. 1a. This is problematic in that two frame requests are required, requiring synchronization in their respective transmissions.

It would therefore be desirable to add a capability to provide an offset time to schedule channel quieting within a beacon interval thereby overcoming the restriction of having channel quieting always begin immediately at the start of a beacon transmission. It would also be desirable to integrate the channel quiet element and channel measurement element into a single unified element thereby simplifying the MAC protocol and providing a more streamlined means of making 'clean' measurements in the channel.

The present invention addresses the foregoing needs by providing a unified element for use in a WLAN, the element uniquely integrating capabilities for quieting the channel and/or making measurement requests of stations (STAs) in the network. These features are at present, separately provided in a channel quieting element and a measurement request (MRQ) element, respectively.

The format of the unified element of the invention, according to one embodiment, includes a number of fields including: a "count" field for specifying a number of beacon intervals that the channel quieting and/or measurement requests shall be repeated over. A second field referred to as an "offset" field which specifies, for each beacon interval specified in the "count" field, a time interval (i.e., offset period) measured from the start of the beacon interval after which the STA shall halt transmissions and/or make measurement requests. A third field, used in conjunction with the offset field, referred to as a "quiet time" field for specifying a time interval whose start time is measured from the end of the specified "offset" time. The quiet time specifies a time interval inside of which the STA shall halt transmissions and/or make measurement requests. Additional fields of the single unified element of the invention include a "measurement ID" field for specifying specific measurements to be requested and a "Channel List" for specifying one or more channels in which channel quieting and/or measurement requests will be performed.

One advantage of the unified element of the invention is that, by combining both channel quieting and measurement request provisions in a single unified element, the MAC protocol is simplified. Another advantage is the ability to transmit the unified element independent of the beacon interval thereby reducing latencies which are normally associated with channel quieting/measurement methods of the prior art. By reducing these latencies, European DFS regulatory requirements for WLANs operating in the 5 GHz band are more easily satisfied.

According to another aspect of the invention, there is provided a channel quieting element which includes an offset feature. The channel quieting element is essentially a conventional channel quieting element modified to incorporate an offset capability. Specifically, the channel quieting element includes two parameters not available for use with the conventional channel quieting element. A first parameter referred to herein as an "offset" parameter for defining an offset time which must first expire in each specified beacon interval before channel quieting can occur. A second parameter referred to herein as an "quiet time" parameter defining a time interval, starting from the expiration of the offset time, in which channel quieting is performed. The combination of the offset time parameter and the quiet time parameter essentially define a 'window' inside of which channel quieting is performed in each beacon interval.

An advantage of the channel quieting element of the invention is that channel quieting is more flexibly performed. That is, the offset feature provides a capability for performing channel quieting at any point after the start of a beacon transmission. This capability may be used to quiet the channel at a time when radar transmissions are expected (e.g., near the end of a beacon interval) without the associated drawback of quieting the channel for the entire beacon interval as is required in a conventional channel quieting element.

It is noted, that while the invention finds suitable application for use with WLANS operating in the 5 GHz band, it is equally applicable for use in other bands such as the 2.4 GHz band.

A more complete understanding of the method and apparatus of the present invention may be had by reference to the following detailed description when taken in conjunction with the accompanying drawings wherein.

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

The unified channel quieting/measurement/request element, as its name implies, contains parameters for performing channel quieting and/or making measurement requests in a wireless local area network (WLAN). In accordance with the unified element of the invention, a single channel element provides a dual capability for quieting the channel for a prescribed number of beacon intervals and for a prescribed start time and duration inside each beacon interval and/or for making measurement requests for a prescribed number of beacon intervals and for a prescribed start time and duration inside each beacon interval.

Figure 2:
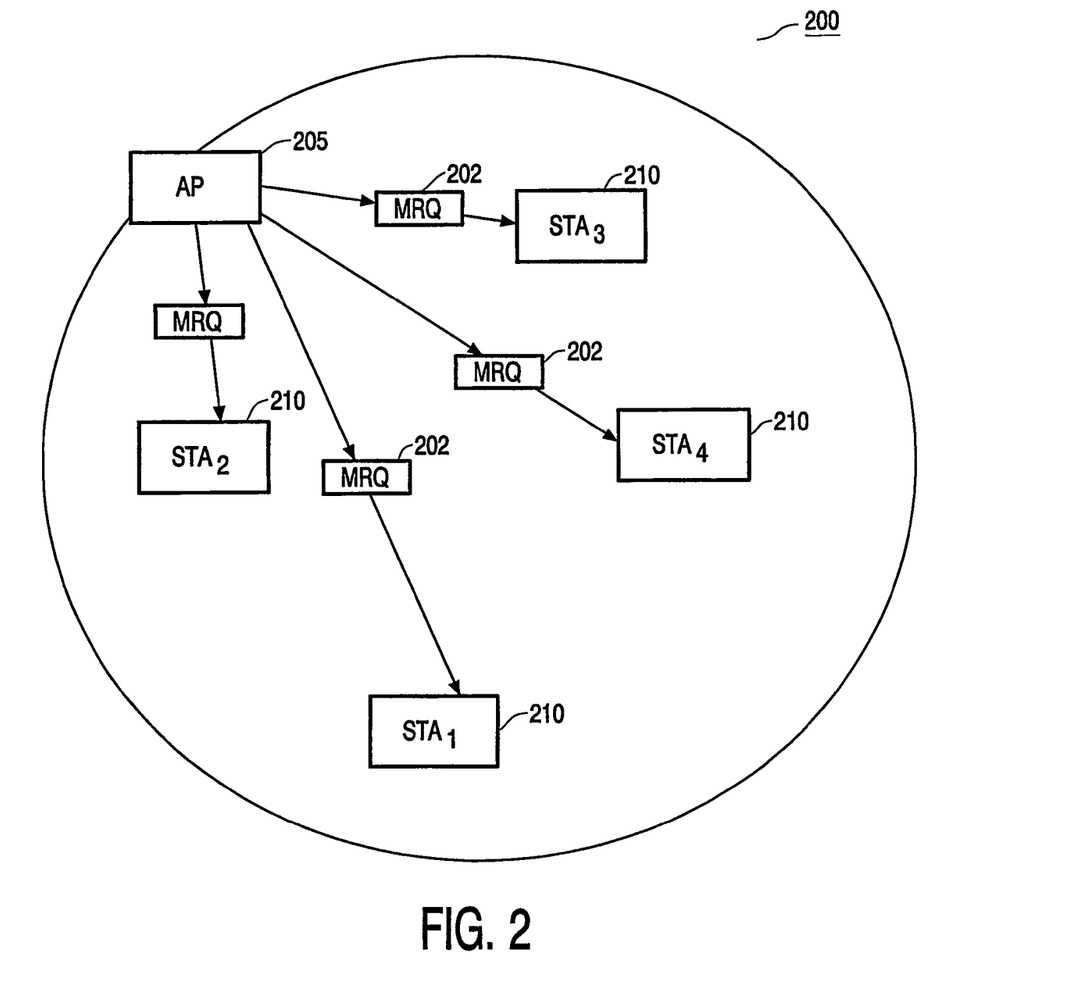
FIG. 2 illustrates a representative network whereto embodiments of the present invention are to be applied.

FIG. 2 illustrates a representative network 200 whereto embodiments of the present invention are to be applied. According to the principles of the present invention, there is provided a single unified element 202 which may be transmitted by the AP 205 to one or more STAs 210 associated with the AP 205, to request measurements and/or to quiet the STAs 210 for some number of beacon intervals. It should be noted that the network shown in FIG. 2 is small for purposes of illustration. In practice, most networks would include a much larger number of mobile STAs 210.

Figure 3:
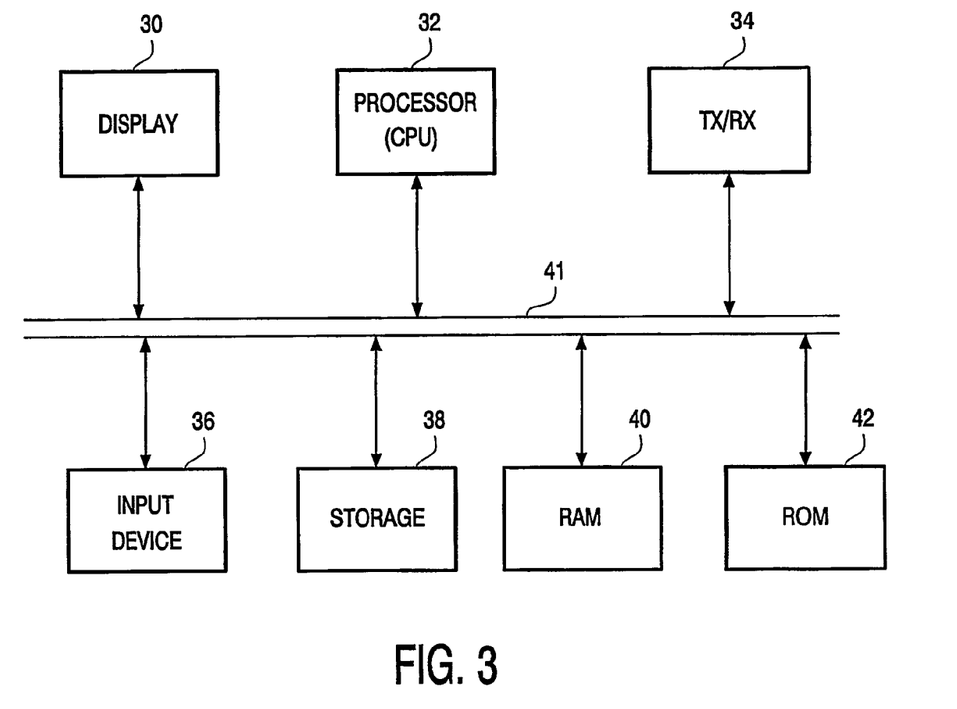
FIG. 3 illustrates a simplified block diagram of an access point (AP) and each station (STA) according to an embodiment of the present invention.

Referring to FIG. 3, the AP 205 and each STA 210 within the WLAN 200 shown in FIG. 2 may include a system with an architecture that is illustrated in the block diagram of FIG. 3. Both the AP 205 and STA 210 may include a display 30, a CPU 32, a transmitter/receiver 34, an input device 36, a storage module 38, a random access memory (RAM) 40, a read-only memory (42), and a common bus 41. Although the description may refer to terms commonly used in describing particular computer systems, the description and concepts equally apply to other processing systems, including systems having architectures dissimilar to that shown in FIG. 3. The transmitter/receiver 34 is coupled to an antenna (not shown) to transmit desired data and its receiver converts received signals into corresponding digital data. The CPU 32 operates under the control of an operating system contained in the ROM 42 and utilizes RAM 40 to perform the frequency selection within a wireless local area network (WLAN), by enabling the AP to provide a new channel or wireless link for all stations (STAs) associated with its BSS.

With continued reference to FIG. 2, to make a channel quieting and/or measurement requests in accordance with the present invention, a management frame including the unified element of the invention is transmitted by the AP 205 to one or more STAs 210 in the network, which are associated with the AP 205. The unified element 202 contains parameter values for instructing the STAs 210 on how to perform channel quieting and/or make measurements. The format of the unified element 202 of the invention will be now be described in greater detail. In part II, a description is provided of a conventional channel quieting element, modified to incorporate an offset feature, as will be described.

I. Unified Element Description

Figure 4:
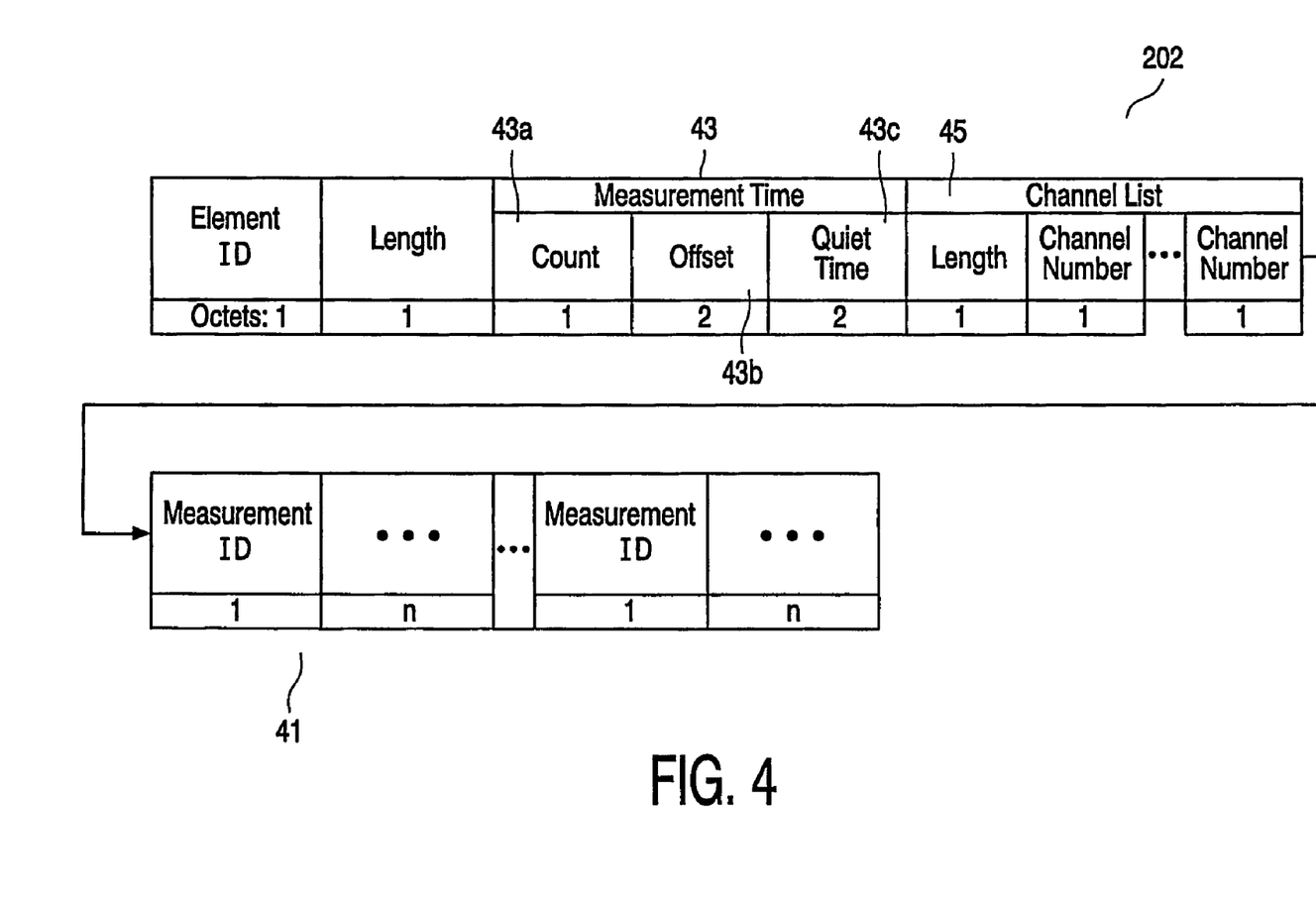
FIG. 4 illustrates the format of a measurement/quiet request (MRQ) element according to an embodiment of the invention.

Referring now to FIG. 4, the format of the element 202 of the invention is shown. In addition to the "Element ID" and "Length" fields, the unified element 202 includes a "measurement time" field 43 which is comprised of three sub-fields: a "count" sub-field 43a for specifying the number of beacon intervals that the measurement shall be repeated over, an "offset" sub-field 43b for specifying the time interval in TUs (time units) starting from target beacon transmission time (TBTT) after which the station (STA) shall not transmit, and a "quiet time" sub-field 43c for specifying the time interval in TUs starting from the end of the 'offset' that the STA shall not transmit. The unified element 202 also includes a channel list field 45 for selecting one or more channels in the network in which to make measurements, and a "Measurement ID" field 47 for specifying the one or more measurements to be made.

Examples of Unified Element Use

A number of exemplary general cases are described below which broadly illustrate the functionality of the unified element 202 of the invention. In particular, the specific cases were chosen to illustrate the inherent flexibility in making measurement requests and performing channel quieting by varying one or more of the parameter values included in the unified element 202 of the invention. It is to be understood, however, that the specific cases are not limiting, rather they are provided as exemplary to facilitate a more complete understanding of the invention.

$1^{st}$ case:

In the first case, the unified element 202 of the invention is used only to perform channel quieting in a single beacon interval without making any associated measurement requests.

Figure 5A:
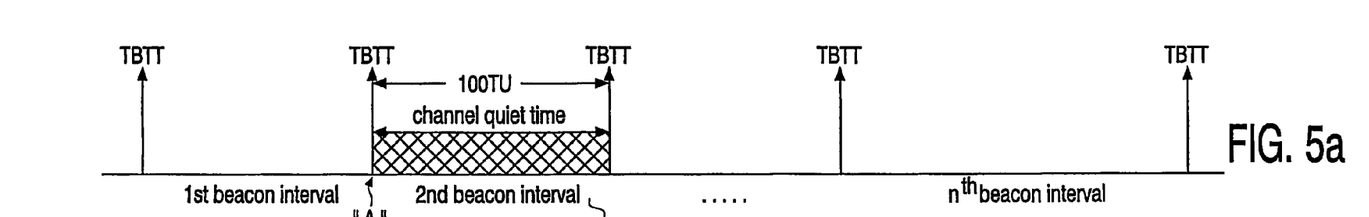
FIGS. 5(a)-(d) illustrate partial timelines for illustrating the effect of transmitting a unified element for the purpose of performing channel quieting and/or making measurement requests, according to an embodiment of the invention.

With reference now to FIG. 5a, there is shown a partial timeline illustrating the result of transmitting the unified element 202 for the purpose of performing channel quieting over an entire single beacon interval without including a measurement request.

In the present case, the current channel is quieted for an entire single beacon interval. A single beacon interval is selected by setting the "count" field 43a of the Unified element 202 to one ('1'). For ease of explanation, the second beacon interval 55 is arbitrarily selected as the interval to be quieted.

In the present case, the current channel is quieted for the entire beacon interval. This is achieved by setting two parameters. The first parameter, referred to above as the "offset" field 43b must be set to zero ('0'). In so doing, channel quieting begins at a point coincident with the start of the beacon interval (Point "A"). The second parameter, referred to above as the "quiet time" field 43c is set to a value equal to the duration of the beacon interval in time units (TUs), which is 100 TU in the present case.

In the present case, no measurement requests are made. As such, the "Measurement ID" element 47 of FIG. 4 is not included.

The pertinent parameter settings for the $1^{st}$ case, discussed above and illustrated in FIG. 5a, are summarized in the table below.

| Measurement Time | | | Channel List | | | |
|---|---|---|---|---|---|---|
| Count | Offset | Quiet Time | Length | Channel Number | ... | Channel Number |
| 1 | 0 | 100 TU | 0 | N/A | N/A | N/A |

100 TU is assumed to be the length of the beacon interval

2nd case:

In the second case, the unified element of the invention is used only to perform channel quieting in a single beacon interval without making associated measurement requests. The present case is distinguishable from the first in that channel quieting is performed only in a portion of the single beacon interval.

Figure 5B:
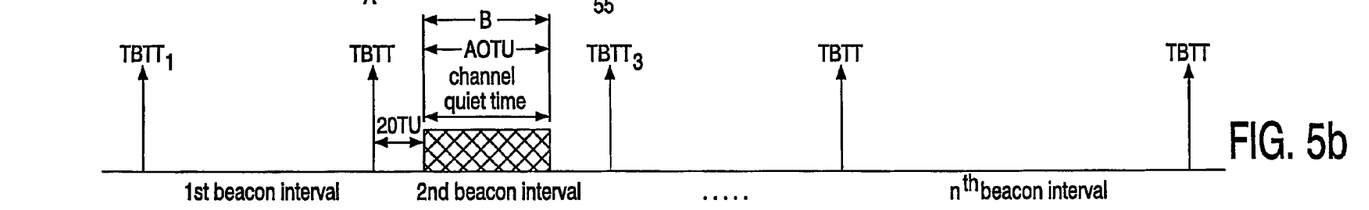

With reference now to FIG. 5b, there is shown a partial timeline illustrating the result of transmitting the unified element 202 for performing channel quieting over a partial single beacon interval without making a measurement request.

Similar to that described above, to select a single beacon interval, the "count" field 43a is set to one ("1"). To perform quieting only over a partial interval of the beacon interval, a non-zero offset value 43b is required. The offset value can be any value in the range, 0<offset<length of the beacon interval (e.g., 100 TU). For ease of explanation, an arbitrary non-zero offset value may be calculated as some fraction of the beacon interval:

$$\text{Offset value}=0.2*\text{Beacon interval}=0.2*100=20 \quad (1)$$

When an offset value is utilized in the unified element 202 of the invention, a corresponding parameter, referred to herein as the "quiet time" parameter must be defined. For ease of explanation, an arbitrary quiet time parameter value may be calculated as some fraction of the beacon interval as:

$$\text{Quiet time}=0.4*\text{Beacon interval}=0.4*100=40 \text{ TU} \quad (2)$$

It should be noted that the combination of the offset time parameter and quiet time parameter essentially define a window (e.g., start time and duration) inside of which channel quieting is performed in the beacon interval. This window is labeled as "B" in FIG. 5b.

The parameter settings for the exemplary $2^{nd}$ case, discussed above and illustrated in FIG. 5b, are summarized in the table below.

| Measurement Time | | | Channel List | | | |
|---|---|---|---|---|---|---|
| Count | Offset | Quiet Time | Length | Channel Number | ... | Channel Number |
| 1 | 20 | 40 | 0 | N/A | N/A | N/A |

100 TU is assumed to be the length of the beacon interval

In the present case, no measurement requests are made and as such the measurement ID element 47 of FIG. 4 is not included.

$3^{rd}$ case:

The present case is distinguishable from the first two in that channel quieting is performed for an infinite number of beacon intervals. That is, once a unified element 202 is broadcast including a directive to perform channel quieting and/or measurements in an infinite number of intervals, that request will be carried out in every beacon interval thereafter until such time as a subsequent unified element 202 is broadcast having a different directive.

Figure 5C:
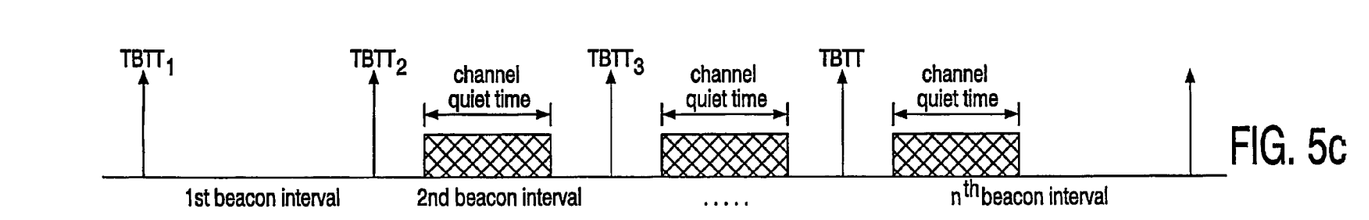

With reference now to FIG. 5c, there is shown a partial timeline illustrating the result of transmitting an unified element 202 for performing continuous channel quieting over an infinite number of beacon interval without making a measurement request. It is noted that FIG. 5c is provided primarily to illustrated that the operations specified are to be performed in each and every beacon interval until a subsequent unified element 202 is received indicating otherwise. In the present example, the operation of performing channel quieting over a partial interval without making associated measurements is shown, solely for purposes of illustration.

To perform the channel quieting in a succession of beacon intervals, the "count" field 43a is set to hex 0xFF in the illustrative embodiment. The remaining parameters are otherwise identical with those described for the $2^{nd}$ case for ease of explanation and will therefore not be further described.

The pertinent field settings for the $3^{rd}$ case, discussed above and illustrated in FIG. 5c, are summarized in the table below.

| Measurement Time | | | Channel List | | | |
|---|---|---|---|---|---|---|
| Count | Offset | Quiet Time | Length | Channel Number | ... | Channel Number |
| 0xFF | 20 | 40 | 0 | N/A | N/A | N/A |

In the present case, no measurement requests are made and as such the measurement ID element 47 of FIG. 4 is not included.

4th case:

In the fourth case, the unified element 202 of the invention is used to perform both channel quieting and making measurement requests. The dual operations highlight the novelty of the inventive unified element 202. In the illustrative example, the dual operations are performed in an infinite number of beacon intervals over a portion of each beacon interval.

Figure 5D:
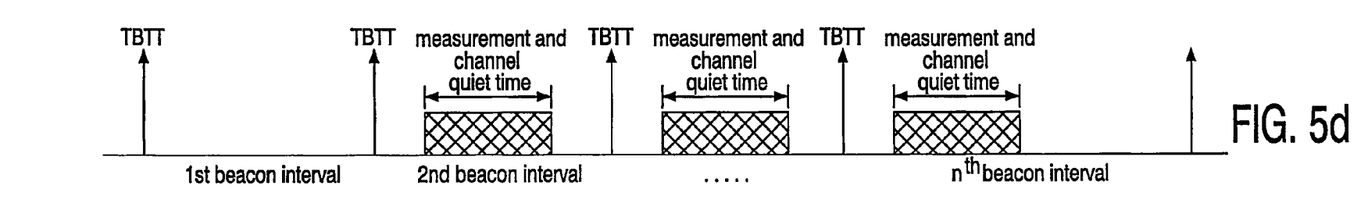

With reference now to FIG. 5d, there is shown a partial timeline illustrating the effect of transmitting a unified element 202 for performing channel quieting over a partial beacon interval while making one or more measurement requests.

Whenever a measurement request is made, the measurement ID element 47 shown in FIG. 4 is included in the unified element 202.

The parameter settings are identical with those shown above for the second case, however, there is also shown some exemplary settings for the channel list and measurement ID element.

| Measurement Time | | | Channel List | | | |
|---|---|---|---|---|---|---|
| Count | Offset | Quiet Time | Length | Channel Number | ... | Channel Number |
| 0Xff | 0.2*BI | 0.4*BI | 1 | 1 | N/A | N/A |

| Measurement ID | ... | ... | Measurement ID | ... |
|---|---|---|---|---|
| 1 | | | N | 1 | N |

Making Measurements without Performing Channel Quieting

In order to exclusively make measurements without performing channel quieting, the quiet time parameter must be set to a value of zero ("0"). To specify one or more measurement requests, one or more measurement identifiers must be included in the "Measurement ID" field of the Unified element 202.

In summation, advantages of the Unified element 202 of the invention over prior art methods for performing channel measurement/quieting include a simplified MAC protocol, higher reliability in transmission by transmitting one frame instead of two dedicated frames (a quieting frame and a management frame), flexibility for performing measurements and flexibility in scheduling quiet times. Furthermore, by providing a unified element with flexible measurement and/or channel quieting options, the possible existence of pre-existing primary users in the channel may be more readily determined. This capability would facilitate meeting the requirements imposed by the European Radio communications Committee (ERC) and it would enhance the performance of an 802.11 WLAN operation in the 5 GHz band or other band range, i.e., 2.4 GHz. It should be apparent to those skilled in the art that this invention can be easily extended to other frequency bands, such as 2.4 GHz, using different physical layer specifications, such as IEEE 802.11b PHY specification.

II. Modified Conventional Channel Quieting Element

As described above, the unified element 202 of the invention provides advantages of making flexible measurements by virtue of being able to specify a variable offset time for either performing channel quieting and/or making measurement requests. Presently, this capability does not exist in the conventional channel quieting element as defined by the IEEE 802.11 standard. However, an offset time capability would be desirable to incorporate into the conventional channel quieting element. Therefore, the present application further provides a 'modified' channel quieting element that provides an offset capability as described above with respect to the unified element 202. In other words, the conventional channel quieting element is modified to the extent of incorporating two parameters, an offset parameter and a quiet time parameter, as described above, to essentially provide a capability of generating a channel quieting 'window' in each beacon interval. In so doing, the channel may be quieted at a time when radar transmissions are expected (e.g., near the end of a beacon interval) without the associated drawback of quieting the channel for an entire beacon interval as is required in a conventional channel quieting element.

Figure 6:
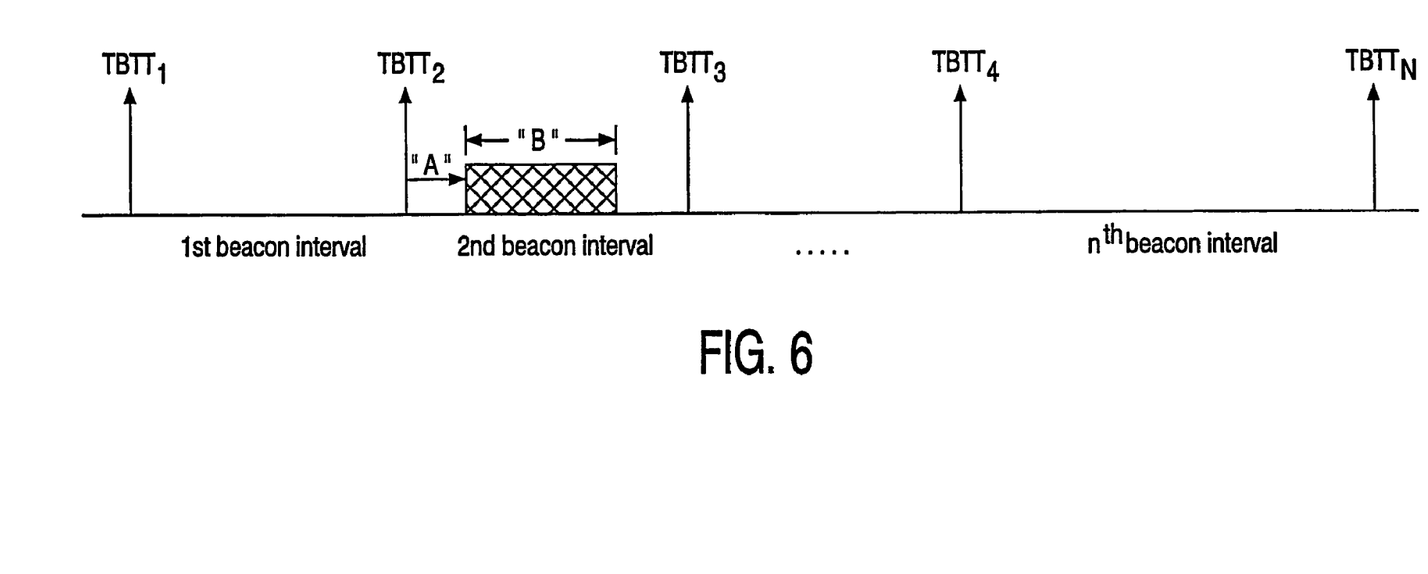
FIG. 6 illustrates the offset parameter for use with the channel quieting element.

FIG. 6 illustrates a partial timeline illustrating such an offset capability in a modified conventional channel quieting element. In the illustrated example, channel quieting is performed over a partial single beacon interval (e.g. the $2^{nd}$ beacon interval). The offset time is defined identically to that described above. That is, the offset time defines a time which must first expire in the beacon interval before channel quieting may begin. The offset time is labeled "A" in FIG. 6, and is included in the modified channel quieting element as a single parameter having a value in the range of the beacon interval. A corresponding "quiet time" parameter defines the length of the channel quieting 'window', labeled "B" in FIG. 6.

The modified channel quieting element of the invention, incorporating offset and quiet time parameters provides similar advantages to those described above with regard to the unified element. Specifically, the conventional channel quieting element as modified provides flexible channel quieting options by providing an offset feature embodied as two offset related parameters. Specifically, the offset parameters define an offset time and quiet time duration parameter which collectively define a channel quieting "window" providing a capability for performing channel quieting over any portion of the beacon interval where radar transmissions are expected without the associated drawback of quieting the entire interval.

The foregoing is to be constructed as only being an illustrative embodiment of this invention. Persons skilled in the art can easily conceive of alternative arrangements providing a functionality similar to this embodiment without any deviation from the fundamental principles or the scope of this invention.

The invention claimed is:

1. A method for performing channel quieting and making measurement requests via a single unified channel quieting and measurement request element in a wireless local area network (WLAN), comprising:
   transmitting said element from a source node to at least one destination node in said WLAN;
   upon receiving said element at said at least one destination node:
   determining, from a first parameter included in said element, a number of beacon interval periods in which said channel quieting and making measurement requests are to be performed;
   determining, from a second parameter included in said element, an offset time defining a time which must first expire prior to performing said channel quieting and making measurement requests, the offset time staring from a target beacon transmission time of each of the beacon interval periods determined from the first parameter;
   determining from a third parameter included in said element, a quiet time defining a time duration over which said channel is quieted and measurements are performed;
   determining from at least a fourth parameter included in said element at least one measurement identifier for determining at least one measurement to be performed in accordance with making said measurement requests; and performing the operations of channel quieting and measurement requests in accordance with said first, second, third and said at least fourth parameters.

2. The method of claim 1, wherein said offset time is defined in transmission units.

3. The method of claim 1, wherein said quiet time is defined in transmission units.

4. The method of claim 1, wherein said request element further includes a channel list defining at least one additional channel in which said channel quieting and/or measurements are to be performed.

5. The method of claim 1, wherein said parameters are reset in a subsequently transmitted element from said source node.

* * * * *